(12) United States Patent
Keck

(10) Patent No.: US 8,141,881 B2
(45) Date of Patent: Mar. 27, 2012

(54) SEAL AND SEAL ARRANGEMENT

(75) Inventor: Matthias Keck, Renningen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 584 days.

(21) Appl. No.: 12/308,455

(22) PCT Filed: Jun. 15, 2007

(86) PCT No.: PCT/DE2007/001066
§ 371 (c)(1),
(2), (4) Date: Dec. 16, 2008

(87) PCT Pub. No.: WO2007/147391
PCT Pub. Date: Dec. 27, 2007

(65) Prior Publication Data
US 2011/0140368 A1  Jun. 16, 2011

(30) Foreign Application Priority Data
Jun. 21, 2006  (DE) .................... 10 2006 028 467

(51) Int. Cl.
*B60T 11/236* (2006.01)
*F02F 5/00* (2006.01)
*F16J 9/20* (2006.01)
*F16J 15/32* (2006.01)
*F16J 15/00* (2006.01)

(52) U.S. Cl. .................... 277/438; 277/552; 277/589

(58) Field of Classification Search .......... 277/436–439, 277/552, 589
See application file for complete search history.

(56) References Cited

U.S. PATENT DOCUMENTS

| | | | | |
|---|---|---|---|---|
| 2,188,855 | A * | 1/1940 | Chievitz | 277/561 |
| 2,778,695 | A * | 1/1957 | Sturtevant | 384/16 |
| 4,155,557 | A * | 5/1979 | Grebert | 277/558 |
| 5,575,484 | A * | 11/1996 | Burke | 277/436 |
| 6,290,235 | B1 * | 9/2001 | Albertson | 277/510 |
| 6,325,383 | B1 * | 12/2001 | Kahle et al. | 277/436 |
| 7,600,761 | B2 * | 10/2009 | Drott et al. | 277/436 |
| 2009/0108542 | A1 * | 4/2009 | Jordan | 277/589 |

FOREIGN PATENT DOCUMENTS

| | | |
|---|---|---|
| BE | 632 658 | 10/1963 |
| DE | 84 05 275 | 8/1984 |
| DE | 42 23 671 | 1/1994 |
| DE | 101 54 092 | 5/2003 |
| EP | 0 152 938 | 8/1985 |
| EP | 0 152 938 | 8/1995 |
| EP | 0 906 528 | 8/2002 |
| FR | 1 298 488 | 6/1962 |
| FR | 1298488 | * 6/1962 |

* cited by examiner

Primary Examiner — Thomas Beach
Assistant Examiner — Nicholas L Foster
(74) Attorney, Agent, or Firm — Paul Vincent

(57) ABSTRACT

A seal is disclosed, for sealing a seal surface (5) between two machine parts (6, 7) which move relative to each other, wherein a seal body of the seal (1) comprises a retainer piece (10), arranged towards the groove base in a groove (8) in one of the machine parts (7), a sealing part (11), arranged in the groove (8) facing the sealing surface and a resilient connector part (12) between the sealing part (11) and the retaining part (10). The seal (1) has a recess (21) between the retainer part (10) and the connector part (12) and a further recess (20) between the connector part (12) and the sealing part (11). The seal (1) has spacer elements (25), said spacer elements (25) extending into at least one of the recesses (20, 21), preferably at least into the recesses (20) between the sealing part (11) and the connector part (12).

3 Claims, 4 Drawing Sheets

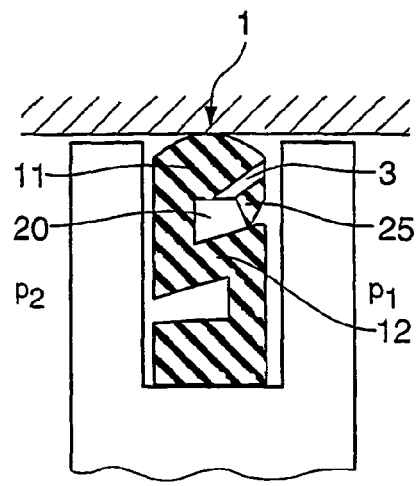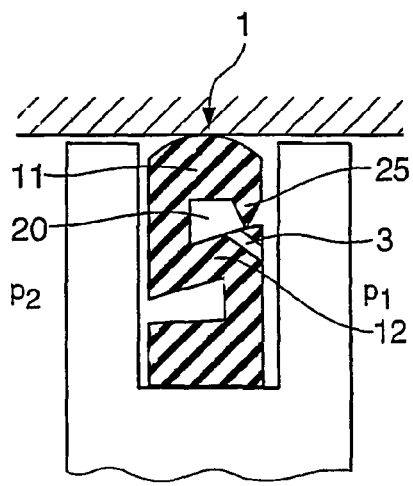
Fig. 5  Fig. 6
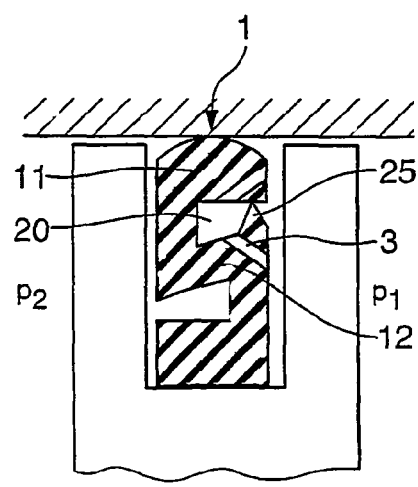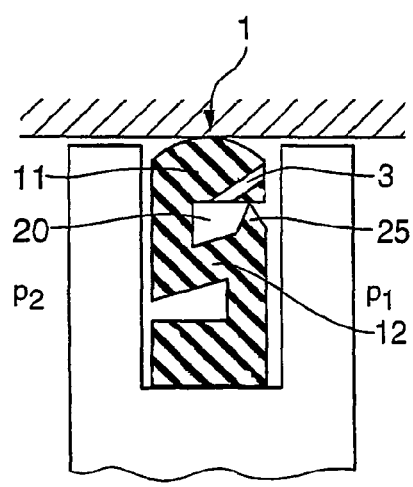
Fig. 7  Fig. 8

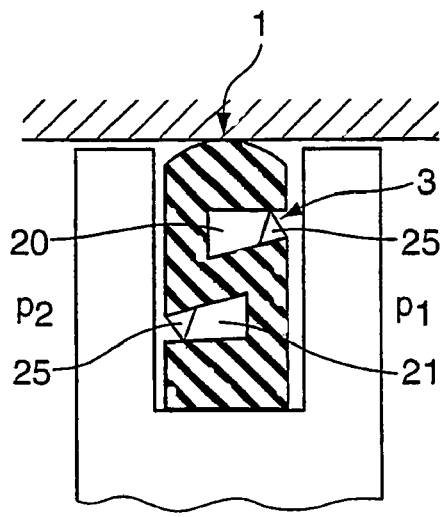
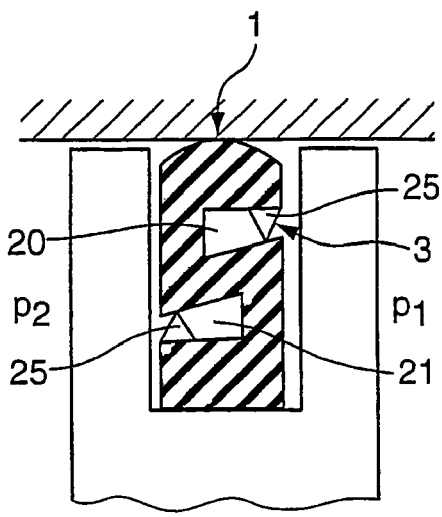
Fig. 9    Fig. 10
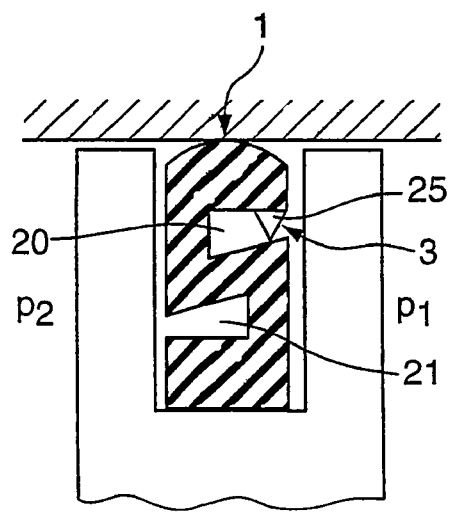
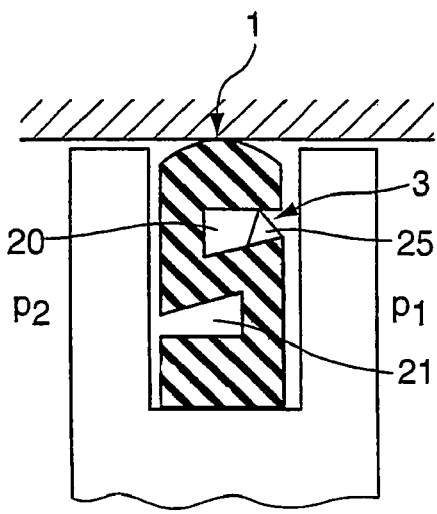
Fig. 11    Fig. 12

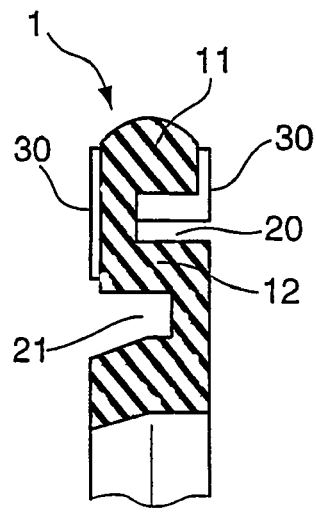
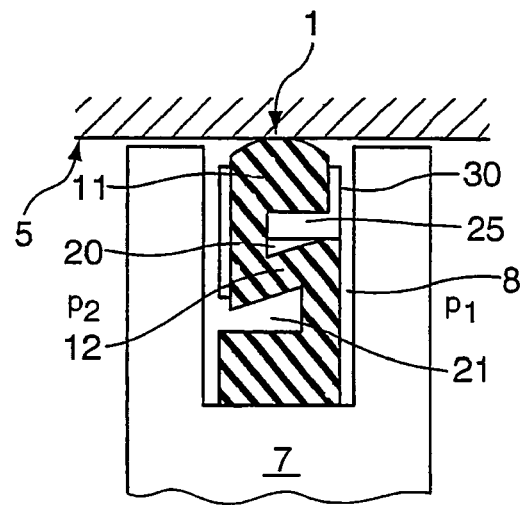
Fig. 13a    Fig. 13b
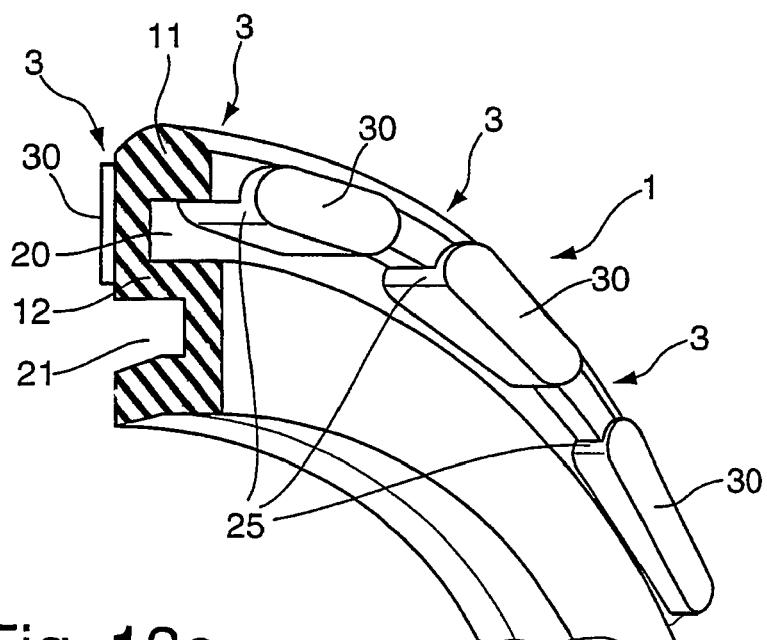
Fig. 13c

SEAL AND SEAL ARRANGEMENT

This application is the national stage of PCT/DE2007/001066 filed on Jun. 15, 2007 and also claims Paris Convention priority to DE 10 2006 028 467.4 filed on Jun. 21, 2006.

BACKGROUND OF THE INVENTION

The invention relates to a seal for sealing a sealing surface between two machine parts that move relative to each other, wherein a seal body of the seal comprises a retaining part, disposed toward the groove base in a groove in one of the machine parts, a sealing part, disposed in the groove facing the sealing surface, and a resilient connector part between the sealing part and the retaining part, and wherein the seal has a recess between the retaining part and the connector part and a further recess between the connector part and the sealing part, and a seal arrangement, wherein the seal is disposed in a groove in one of two machine parts that can move relative to each other.

Such seals have a basic cross-sectional form in the shape of an S or Z, the recesses being formed by this basic shape. The seals are usually manufactured in one piece from a rubber-elastic material, e.g. polyurethane or rubber and constituted as a sealing ring with radial symmetry. In this embodiment, the seals can be used as rod or piston seals for sealing pneumatic applications, e.g. pneumatic cylinders or valves, and/or as rotation seals, e.g. in high-pressure applications.

Such a seal is usually inserted between two machine parts that move axially and/or in a rotary fashion with respect to each other, in a groove in a surface of one of the machine parts, this surface being disposed opposite a sealing surface constituted by a surface of the second machine part. Between these surfaces there is therefore a sealing gap to be sealed. In the case of a sealing ring, the two surfaces are concentrically disposed with respect to one another. Normally, in the case of a piston seal, the groove is disposed inside the machine part; in the case of a rod seal, the groove is disposed on the outer surface of the machine part. The resilient connector part acts as a spring between the sealing part, usually comprising at least one sealing lip, and the retaining part. The retaining part is dimensioned so as to enable a seating of the seal on the base of the groove which is as immobile as possible.

When such a seal is used, e.g. in a pneumatic cylinder, a medium that is under pressure, i.e. a fluid, e.g. oil and/or air, that is in a pressure compartment is reciprocally applied to the seal. To achieve the desired sealing effect, the seal is inserted into the groove prestressed. This compresses the seal to such an extent that the resilient action of the connector part presses the surface of the sealing part that is disposed toward the sealing surface, against the sealing surface. In the case of a sealing ring, the sealing ring is radially compressed. The pressure in the recesses of the seal is activated when the medium is applied. Because the medium under pressure flows into the recesses, the sealing part is pressed against the sealing surface in addition to the spring action of the connector part. For this purpose, such a seal is inserted into the groove with spacing between its surfaces that face the walls of the groove (lateral surfaces) and the groove walls. The medium is therefore free to flow into the recesses between the groove walls and the lateral surfaces.

The recess adjacent to the sealing part can result in malfunctions during operation, e.g. of a pneumatic cylinder. The sealing part can tip over in the groove in response to forces exerted on the seal during movement of the machine parts, which are sealed against each other by means of the seal and/or due to the alternating pressure of the medium. If this is the case then, given a pressure p1 exerted on one of the lateral surfaces, pressure p2 built up on the opposite side, i.e. on the second lateral surface, can cause the seal to lift away from the sealing surface. If this loosening occurs, the sealing effect is no longer achieved. This malfunction is termed seal blow-by. The sealing function can only be restored by removing the pressure from both lateral surfaces.

The EP 0 906 528 B1 discloses a seal of this kind that is constituted as a sealing ring, wherein precautions against blow-by have already been taken. For this purpose, the sealing ring has radial pressure equalization ducts that allow the media on both sides of the sealing ring to flow into the recesses of the sealing ring. However, the radial pressure equalization ducts cannot prevent the sealing part from tipping over.

In some cases, therefore, such seals are installed having been pressed on a block, i.e. the seals are so greatly compressed, radially in the case of sealing rings, that the recesses are filled by the intermediate part, i.e. are practically no longer able to perform their function in the installed condition, i.e. they do not permit pressure activation. In this case, tipping over of the section of the seal is prevented in the dynamic sealing region but the functional behavior of the seal is adversely affected to a great extent and friction is increased.

The object of the invention is to provide a seal and a seal arrangement that avoid the disadvantages of the prior art and, in particular, the occurrence of the malfunction of blow-by while retaining good sealing function in all installation situations.

SUMMARY OF THE INVENTION

This object is solved by the elements of the independent claims. The dependent claims refer to preferred embodiments of the invention.

An inventive seal for sealing a sealing surface between two machine parts that move relative to each other comprises a seal body comprising a retaining part, disposed toward the groove base in a groove in one of the machine parts, a sealing part, disposed in the groove facing the sealing surface (and having at least one sealing lip), and a resilient connector part between the sealing part and the retaining part. At least one sealing lip may be molded onto the sealing part. On the seal, or its seal body, a recess is constituted between the retaining part and the connector part and a further recess is constituted between the connector part and the sealing part. The recesses project into the dimensions of the seal body. The seal may thus be shaped with the basic shape of an S or a Z.

According to the invention, the seal has spacer elements, which extend into at least one of the recesses, preferably at least into the recess between the sealing part and the connector part. The spacer elements therefore project radially past the surfaces of the seal body that form the recesses.

The spacer elements keep the associated recess at least partially open even if the seal is compressed in the installed condition. The spacer elements molded onto the sealing part then touch the opposite partial surface with their free end if the degree of compression is sufficiently high. Despite being compressed, the recess near the sealing surface therefore continues to define a cavity into which a medium can flow for pressure activation of the sealing ring, preferably via one or more connecting ducts. This ensures pressure activation of the seal even if it is greatly compressed. The spacer elements also support the seal, thus preventing the seal from tipping over to act against the occurrence of blow-by. This permits fault-free deployment of the inventive seal as a seal for reciprocal and rotary motion.

The inventive seal has at least one pressure equalization duct, wherein the pressure equalization ducts constitute pressure equalization conduits between the recess between the connector part and the sealing part and at least one surface of the seal disposed toward a wall of the groove. The pressure equalization ducts are therefore disposed such that the medium can flow from a pressure compartment at least into the recess nearer the seal gap. Such a pressure equalization duct also permits unhindered flow of the medium from the pressure compartment into the recess for pressure activation of the surface of the sealing part of the seal facing the sealing surface, even when the seal is in the compressed (installed) condition. In particular, if the spacer elements are disposed in the outer region of the recesses, i.e. near the lateral surfaces of the seal, this can prevent obstruction of the free flow of the medium into a cavity in an inner region of the recess.

The seal is constituted as a sealing ring for applications of the inventive seal between radially symmetrical machine parts, e.g. a piston cylinder arrangement or a rotating shaft. In the case of a piston moving in a cylinder, the sealing part at the sealing ring can be arranged radially and externally so that the sealing ring usually can be inserted in a groove in the piston. In the case of use as a rod seal, the sealing part on the sealing ring must preferably be arranged radially and internally.

If the spacer elements are constituted as ribs extending in the longitudinal direction of the recesses, i.e. in the case of a sealing ring, protruding radially in a circular arc, the spacer elements can be constituted in such a way as to leave connected cavities in the inner part of the recesses, i.e. extending circumferentially in the case of a sealing ring, into which the medium can preferably flow through connecting ducts. In this way, pressure activation is achieved evenly along the entire length of the seal, or around its entire circumference. Alternatively, the spacer elements may also be constituted by intermittent, e.g. conical, protuberances.

If the seal has at least one pressure equalization duct between the recess between the connector part and the retaining part and at least one surface of the seal is disposed toward a wall of the groove, pressure activation of the retaining part at the groove base can also be ensured in the aforesaid geometric conditions.

The pressure equalization ducts can be constituted simply by interruptions in the spacer elements. The pressure equalization ducts can also be constituted by holes in the seal body, with the holes connecting the recesses and surfaces of the seal disposed toward a wall of the groove. The holes extend at least partially axially in the case of a sealing ring.

In an especially beneficial embodiment, the seal has groove wall spacer elements, wherein the pressure equalization ducts are constituted at least partially by interruptions in the groove wall spacer elements. These pressure equalization ducts then extend at least partially in the direction from the groove base to the sealing surface, i.e. in the case of a sealing ring, radially outward. Manufacturing of the seal is facilitated if the groove wall spacer elements and spacer elements are extensions of each other in the region of the sealing part on the further recess.

In an inventive seal arrangement, an inventive seal is disposed in a groove of one of two machine parts that move relative to each other.

BRIEF DESCRIPTION OF THE DRAWING

The invention is explained in more detail using examples with reference to the drawings.

FIGS. 1 to 12 each show a cross-section through an inventive seal arrangement.

FIG. 13 show an inventive sealing ring in various views, including a perspective view.

DESCRIPTION OF THE PREFERRED EMBODIMENT

Figure 1:
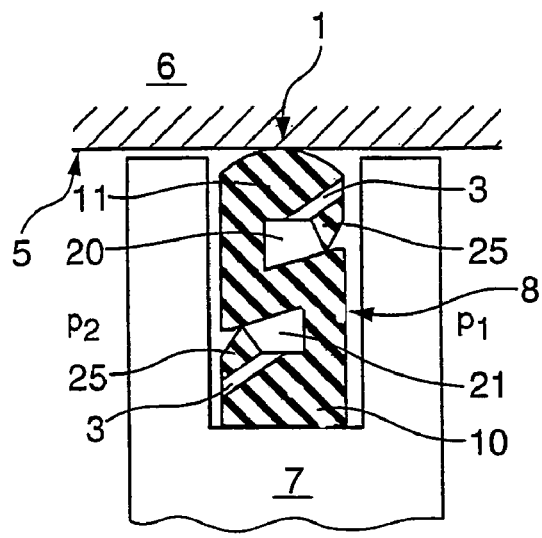

The figures of the drawings show the inventive object very schematically and are not scale drawings. The individual components of the inventive object are shown in such a way that their structure is clearly visible. FIGS. 1 to 4 show an inventive seal arrangement with an inventive seal 1 with a basic cross-sectional form in the shape of an S, wherein seal 1 has pressure equalization ducts 3 constituted as holes in the seal body of seal 1. Seal 1 is preferably made of a single piece of a rubber-elastic material.

An inventive seal 1 is inserted in a groove 8 of one of the machine parts 7 for sealing of sealing surface 5 between machine parts 6, 7 that move relative to each other. On either side of the second machine part 7, e.g. a piston in a pneumatic application, there is a medium under pressure $p_1$ and $p_2$ respectively. The seal body has a retaining part 10 disposed toward the groove base, a sealing part 11 disposed in groove 8 toward the sealing surface, and a resilient connector part 12 between the sealing part 11 and the retaining part 10. In the seal body of the seal 1, a recess 20 is constituted between the retaining part 11 and the connector part 12 (recess nearer the sealing surface). A further recess 21 is constituted between the connector part 12 and the sealing part 10 (recess nearer the groove base). On the seal body of the seal 1, spacer elements 25 are constituted that extend into the recesses 20, 21. The spacer elements 25 are constituted as ribs extending in the longitudinal direction of the recesses 20, 21, i.e. radially in the case of a sealing ring. In the view shown in the figures, the surface of the sealing part 11 facing the sealing surface 5 exhibits a curvature. The degree of this curvature forms a sealing lip.

The pressure equalization ducts 3 provide pressure equalization conduits between the recesses 20, 21 and the corresponding surface of the seal 1 disposed toward a wall of the groove 8, i.e. a lateral surface of the seal 1.

Because pressure equalization ducts 3 lead into both recesses 20, 21, in the illustrated seals 1, pressure activation both improves the sealing effect and the seating of the retaining part 10 on the groove base. The latter characteristic is especially beneficial if an inventive seal 1 is used as a rotation seal.

In FIG. 1, a pressure equalization duct 3 is disposed in the sealing part 11 and a pressure equalization duct 3 is disposed in the retaining part 10. In FIG. 1, the ribs of the spacer elements 25 are molded onto the sealing part 11 and molded onto on the retaining part 10.

Figure 2:
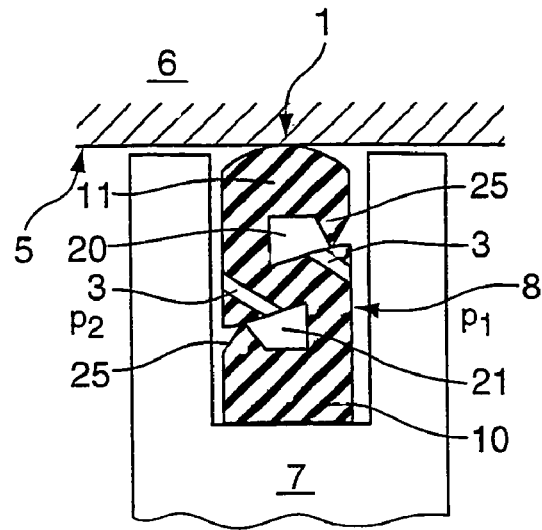

In FIG. 2, two pressure equalization ducts 3 are disposed in the connector part 12. In FIG. 2, the ribs of the spacer elements 25 are molded onto the sealing part 11 and onto the retaining part 10.

Figure 3:
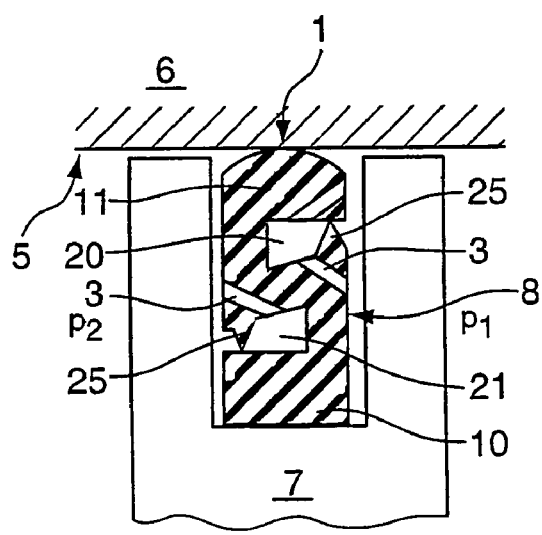

In FIG. 3, two pressure equalization ducts 3 are disposed in the connector part 12. In FIG. 3, the ribs of the spacer elements 25 are molded onto the connector part 12.

Figure 4:
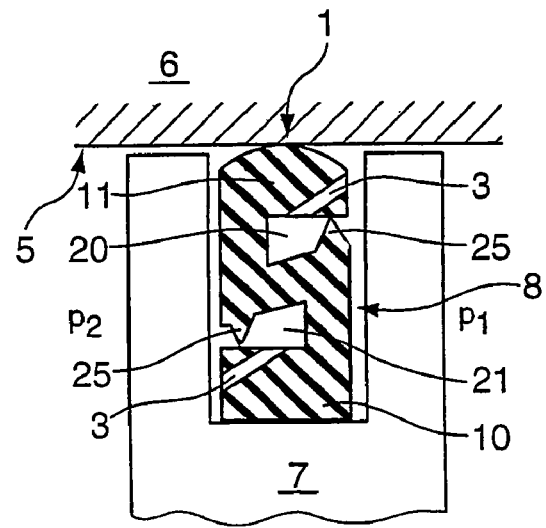

In FIG. 4, one pressure equalization duct 3 is disposed in the sealing part 11 and one in the retaining part 10. In FIG. 4, the ribs of the spacer elements 25 are molded onto the connector part 12.

In FIG. 5, one pressure equalization duct 3 is disposed in the sealing part 11. In FIG. 5, the ribs of the spacer elements 25 are molded onto the sealing part 11.

In FIGS. 5 to 8, an inventive seal arrangement is shown in cross-section, wherein seal 1 has one or more holes in the seal body as pressure equalization ducts 3. Only the recess 20 between the sealing part 11 and the connector part 12 has pressure equalization ducts 3 and spacer elements 25. In FIGS. 5 and 6, a rib as a spacer element 25 is molded onto the sealing part 11, whereas in FIGS. 7 and 8, a rib as a spacer element 25 is molded onto the connector part 12. In FIGS. 5 and 8, a hole as a pressure equalization duct 3 is disposed in the sealing part 11, where as in FIGS. 6 and 7, a hole as a pressure equalization duct 3 is disposed in the connector part 12.

FIGS. 9 to 12 show an inventive seal arrangement in a cross-section, wherein seal 1 has intermittent, e.g. conical or rib-like protuberances as spacer elements 25, i.e. as a support for the recesses 20, 21, and pressure equalization ducts 3 between the spacer elements 25. As in FIGS. 5 to 9, in FIGS. 11 and 12, spacer elements 25 are only present on the recess 20 nearer the sealing surface. The pressure equalization ducts 3 are constituted by interspaces between the intermittent protuberances or by interruptions of the rib-like protuberances. The plane of the cross-section shown in each figure extends through such interspaces or interruptions. The spacer elements 25 are molded onto the connector part 12 in FIG. 9. In FIG. 10, the spacer elements 25 are molded onto sealing part 11 and onto the retaining part 10. The spacer elements 25 are molded onto the sealing part 11 in FIG. 11. The spacer elements 25 are molded onto the connector part 12 in FIG. 12.

FIGS. 13 show an inventive sealing ring 1 with rib-like protuberances for constituting axial and radial pressure equalization ducts 3 in various perspectives. FIG. 13a shows a cross-section of half of an inventive sealing ring 1 before installation; FIG. 13b shows a cross-section of half of an inventive seal arrangement with the sealing ring 1 installed in a groove 8 between machine parts 6, 7 that move relative to each other; and FIG. 13c shows part of a three-dimensional view of a cut sealing ring 1. The plane of each of the cross-sectional views is through one of the pressure equalization ducts 3. Radially circumferential groove wall spacer elements 30 are molded onto the sealing ring 1. Because of the radial symmetry of the sealing ring 1, the recesses 20, 21 are also constituted radially circumferentially. The groove wall spacer elements 30 on the recess 20 nearer the sealing surface extend into the recess nearer the sealing surface as an interrupted rib-like protuberance 20, enabling the groove wall spacer elements 30 also to act as spacer elements 25. The groove wall spacer elements 30 and the spacer elements 25 are therefore extensions of each other and are disposed in the region of the surface of the sealing part 11 on the recess 20, i.e. the recess 20 nearer the sealing surface or molded onto the sealing part 11. The pressure equalization ducts 3 are constituted by interruptions of these groove wall spacer elements 30. The pressure equalization ducts 3 on the sealing ring 1 extend in the axial direction in the regions of the groove wall spacer elements 30 acting as spacer elements 25 in the recess 20 nearer the sealing surface and extend in the radial direction on the lateral surface of the sealing ring 1, i.e. in the direction from the groove base to the sealing surface 5. Therefore pressure equalization ducts 3 extending in the radial direction are combined with pressure equalization ducts 3 extending in the axial direction. In FIG. 13b, it can be seen that in the installed condition, the sealing ring 1 is compressed in the radial direction to the extent that the spacer elements 25 molded onto the sealing part 11 with their free end touch the partial surface of the recess 20 nearer the sealing surface formed by the connector part 12. Despite this compressed condition, a cavity is constituted by the recess nearer to the sealing surface into which a medium can flow for pressure activation of the sealing ring 1.

A seal 1 is proposed for sealing a sealing surface 5 between two machine parts 6,7 that move relative to each other, wherein a seal body of seal 1 has a retaining part 10 disposed in a groove 8 of one of the machine parts 7 toward the groove base, a sealing part 11 disposed in groove 8 toward the sealing surface, and a resilient connector part 12 between the sealing part and the retaining part 10, and wherein the seal 1 has a recess 21 constituted between the retaining part 10 and the connector part 12 and a further recess 20 constituted between the connector part 12 and the sealing part 11. The seal 1 has spacer elements 25, wherein the spacer elements 25 extend into at least one of the recesses 20, 21, preferably into at least the recess 20 constituted between the sealing part 11 and the connector part 12.

The invention is not limited to the examples described above. A number of variations can be envisioned that make use of the features of the invention in fundamentally different designs. For example, a basic cross-sectional form in the shape of a Z could be used instead of the S-shaped basic cross-sectional form described.

I claim:

1. A seal for sealing a first machine component with respect to a second machine component, the first machine component having a sealing surface and the second machine component having a groove facing the sealing surface, wherein the first and the second machine components move relative to each other, the seal having a seal body comprising:
   a retaining part disposed towards a groove base of the groove;
   a sealing part disposed in the groove facing the sealing surface;
   a resilient connector part disposed between said sealing part and said retaining part;
   means defining a first recess disposed radially between said retaining part and said connector part;
   means defining a second recess disposed radially between said connector part and said sealing part; and
   groove wall spacer elements constituted as interrupted ribs extending about the seal body and projecting radially into said second recess, wherein interruptions between adjacent said ribs define pressure equalization ducts extending axially in the second recess and radially at a side surface of the sealing ring.

2. A seal arrangement having the seal of claim 1, wherein the seal is disposed in said groove of said second machine component.

3. The seal of claim 1, wherein the groove wall spacer elements project into said second recess throughout an entire axial extent thereof.

* * * * *